US005887064A

United States Patent [19]
Seysen

[11] Patent Number: 5,887,064
[45] Date of Patent: Mar. 23, 1999

[54] CRYPTOGRAPHIC EQUIPMENT

[75] Inventor: Martin Seysen, Unterschleissheim, Germany

[73] Assignee: Siemens Aktiengesellschaft, Munich, Germany

[21] Appl. No.: 246,133

[22] Filed: Sep. 8, 1988

[30] Foreign Application Priority Data

Sep. 9, 1987 [DE] Germany .......................... 37 30 134.9

[51] Int. Cl.$^6$ .............................. G06K 5/00; H04K 1/00
[52] U.S. Cl. ................ 380/23; 235/380; 380/25
[58] Field of Search ................ 380/23, 25; 235/380

[56] References Cited

U.S. PATENT DOCUMENTS 4,694,492  9/1987  Wirstrom et al. ................. 380/23
4,800,590  1/1989  Vaughan ........................... 380/23
4,885,788  12/1989  Takaragi et al. ................... 380/23
4,907,272  3/1990  Hazard et al. ..................... 380/23

Primary Examiner—Stephen C. Buczinski
Attorney, Agent, or Firm—Hill & Simpson

[57] ABSTRACT

Cryptographic equipment is used with a number of user identification cards which are distributed to various authorized users, each user identification card being a non-volatile memory which can be overwritten in which a user-associated external crypto-ignition key is stored. Insertion of the user identification card in the cryptographic equipment releases the cryptovariable code by cooperation with an internal crypto-ignition key stored internal in a sub-memory of the cryptographic equipment for every authorized user. The cryptovariable required for setting and controlling the cryptosequence generator is stored in encoded form in another sub-memory of the variable memory, and is capable of being decoded with the cryptovariable code.

7 Claims, 2 Drawing Sheets

CRYPTOGRAPHIC EQUIPMENT

BACKGROUND OF THE INVENTION

1. Field of the Invention

The present invention is directed to cryptographic equipment for encoding information to be transmitted, including an encoder stage and a cryptovariable processing stage.

2. Description of the Prior Art

In the transmission of information, particularly voice and data, it is sometimes necessary to ensure that the information to be transmitted is accessible only to authorized personnel. If high secrecy demands are made on the information to be transmitted, it is known, for example, from German OS 21 60 132 to transmit the information in digital form and to encode the information for transmission in a suitable manner with a cryptosignal sequence. At the receiver, the incoming encoded information must then be then decoded with the same cryptosignal sequence in order to regain the original information.

If the secrecy of the information to be transmitted is to be guaranteed, the cryptographic equipment for encoding at the transmission side and for decoding at the reception side must be protected against misuse. It must be ensured that such cryptographic equipment is only accessible to authorized personnel. As soon as the cryptovariable is entered, cryptographic information supplied with such cryptovariables (codes) via a cryptovariable input must be classified for a secrecy level associated with the cryptovariable. When this secrecy level is"Confidential" or higher, the cryptographic equipment must be appropriately secured to prevent access by unauthorized personnel. For example, the equipment may be stored locked in a safe. The use of cryptographic equipment by authorized users is thus made difficult.

SUMMARY OF THE INVENTION

It is an object of the present invention to provide cryptographic equipment of the type described above which permits the equipment to be stored unlocked, even given cryptovariable input, while still maintaining the necessary security against wrongful use.

This and other objects are achieved in accordance with the principles of the present invention in cryptographic equipment having a cryptovariable processing stage which includes a program control and a non-volatile internal variable memory which can be overwritten. For offering the cryptovariables, the internal memory is in communication with a non-volatile external memory which can also be overwritten. The external memory is in the form of a plurality of user identification cards respectively issued to each authorized user. The memory on the user identification card is in communication with the internal memory via a user card input. The internal memory is subdivided into a cryptovariable sub-memory, and a plurality of user sub-memories corresponding in number to the plurality of authorized user identification cards. The cryptovariables supplied to the cryptovariable processing stage via a cryptovariable input are stored in a form encoded with and cryptovariable code. The cryptovariable code derives from the co-operation of an internal CIK (crypto-ignition key) stored in one of the users sub-memories of the variable memory with an external CIK stored in the user identification card. The cryptovariable code is briefly regenerated for decoding and offering of the cryptovariables which have been stored in coded form. This brief regeneration occurs at the beginning of a use of the equipment given a positive result of an authorization check of the user identification card inserted in the user card input.

The subdivision of the cryptographic equipment into the actual encoding equipment and into a cryptovariable processing stage for a plurality of users identified by user cards offers high security against unauthorized use. This is because the cryptovariable is stored in the cryptovariable processing stage only in encoded form, and further the cryptovariable code for decoding and enabling the cryptovariables is not stored in the equipment itself, i.e., it is not available without taking further steps. Only when the authorization check of the user identification card inserted in the user card input is positive is the cryptovariable briefly generated for this user in the cryptovariable processing stage. This brief regeneration occurs by operation of the internal crypto-ignition keys stored in the sub-memory associated with the user whose card is inserted in the user input, and the cooperating with an external crypto-ignition key stored in the user identification card. A particular advantage of this system is that, given a change of encoded cryptovariables to be stored in the equipment, only one of the plurality of user identification cards is required for the internal generation of the cryptovariable code required for this purpose.

As used herein the term "crypto-ignition key" means a starting cipher, i.e., a coded variable required to start a cryptographic process. As used herein, the term "anti-comprise variable" means an anti-tamper variable, which allows a check to be carried out at any time to determine whether the crypto equipment has been subjected to an attempted unauthorized access.

A corresponding method for operating cryptographic equipment of the type described above is also disclosed.

DESCRIPTION OF THE PREFERRED EMBODIMENTS

Figure 1:
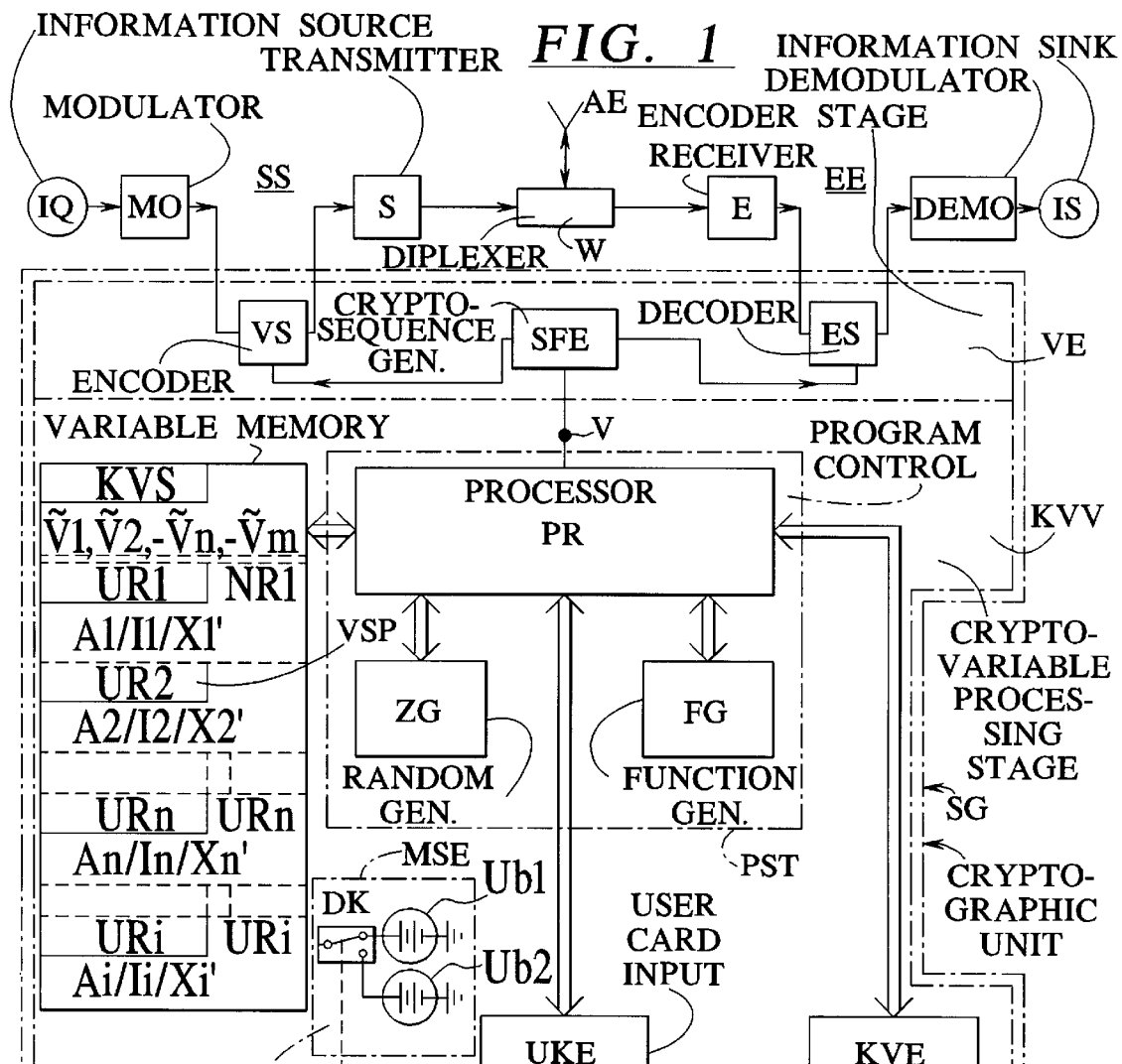
FIG. 1 is a schematic block diagram of cryptographic equipment at a transmission/reception station constructed in accordance with the principles of the present invention.

As shown in FIG. 1, a cryptographic equipment SG for a transmission/reception station constructed in accordance with the principles of the present invention is schematically divided into a transmission side SS and a reception side EE. The cryptographic equipment SG consists of an encoding stage VE and a cryptovariable processing stage KVV.

The transmission side SS of the transmission/reception station essentially includes an information source IQ, a modulator MO following the information source IQ, for example, a delta modulator or a PCM modulator, and a transmitter S having an output in communication with a transmission/reception antenna AE via a diplexer W. The reception means EE includes a receiver E which supplies the received signal from the antenna AE and the diplexer W to an information sink IS via a demodulator DEMO.

The encoding stage VE of the cryptographic equipment SG includes an encoder VS at the transmission side, a decoder ES at the reception side, and a cryptosequence generator SFE which supplies the encoder VS and the decoder ES with a cryptosignal sequence. For encoding the digital information at the output of the modulator MO on the transmission side SS, the encoder VS is connected to the signal train between the modulator output and the input of the transmitter S. For decoding the received digital encoded information, the decoder ES is connected into the signal train between the output of the receiver E and the input of the demodulator DEMO.

The cryptosequence generator SFE has a set or control input by means of which a cyrptovariable V (code) is supplied thereto by the cryptovariable processing stage KVV.

The cryptovariable processing stage KVV generally consists of a program control PST, a variable memory VSP, a user card input UKE, a cryptovariable input KVE, and an anti-tamper stage MSE.

The program control PST consists of a processor PR, a random generator ZG connected thereto, and a function generator FG also connected the processor PR. The random generator ZG and the function generator FG permit a variable modification based on a "one-way function". The processor PR is also in communication with the user card input UKE, the cryptovariable input KVE, and the variable memory VSP.

The variable memory VSP includes a cryptovariable sub-memory KVS for storing encoded cryptovariables $\widetilde{V1}$, $\widetilde{V2}$, ... $\widetilde{Vn}$, ... $\widetilde{Vm}$. The variable memory VSP also includes a plurality of user sub-memories UR1, UR2, ... URn ... Uri corresponding in number to the plurality of user identification cards UAKn. Each of the user sub-memories UR1, UR2, ... Urn ... URi contains three user-associated variables, discussed in greater detail below, in addition to a user identification card number NR1, NR2, ... NRn ... NRi, which represents its address.

The anti-tamper stage MSE includes a lid contact switch DK by which the variable memory VSP is supplied with a positive operating voltage Ub1 when the equipment lid, and thus the contact switch DK, are closed. If the equipment lid is opened, the contact switch DK switches to connect the variable memory VSP to a negative operating voltage Ub2, which causes a rapid and complete erasure of the memory content of the variable memory VSP.

Figure 2:
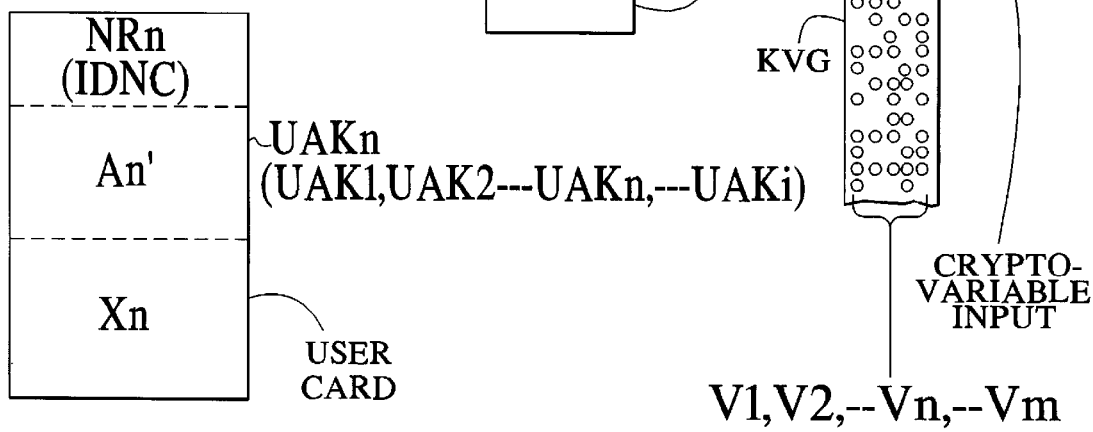
FIG. 2 is a schematic block diagram of a user identification card for use in the equipment shown in FIG. 1.

The user identification card UAKn which is schematically shown in FIG. 2 is a representative example of each card in the plurality of user identification cards UAK1, UAK2, ... UAKn, ... UAKi. The card UAKn is a non-volatile memory which can be overwritten, for example, an EEPROM card, a magnetic card, a floppy disk or a chip card. In addition to containing a user card identification number NRn and, if necessary, an identification code IDNC, each user card also contains two further variables An' and Xn, discussed in greater detail below.

The cryptovariable input KVE permits cryptovariables V to be entered in combination with a cryptovariable generator KVG which may, for example, be a punched tape as shown in FIG. 1.

The cryptovariable processing stage KVV is only operational in combination with an authorized user identification card UAKn. For initialization of the cryptographic equipment in combination with the simultaneous initialization of user identification cards, a first user identification card UAK1 is introduced into the user card input UKE. It is assumed that this user identification card UAK1, as well as the variable memory VSP, do not have a valid memory content. For initialization, the program control PST first generates and calculates an internal crypto-ignition key I1 and an external crypto-ignition key X1. These crypto-ignition keys satisfy the condition C=I1 ⊕ X1, or in general C=In ⊕ In. The symbol ⊕ indicates bit-by-bit modulo-2 addition, and C denotes the cryptovariable key valid for all authorized users with which the cryptovariables V1, V2 ... Vn, ... Vm to be entered at a later time via the cryptovariable input KVE are coded and subsequently stored in the cryptovariable sub-memory KVS.

The internal crypto-ignition key I1 is stored in the user sub-memory UR1, and the external crypto-ignition key X1 is stored in the user identification card UAK1. The function generator FG calculates a modified external crypto-ignition key X1' from the external crypto-ignition key X1 by means of the one-way function f according to the relationship X1'=f(X1), or in general terms, Xn'=f(Xn). The modified external crypto-ignition key X1' is stored in the user sub-memory UR1.

Additionally, the program control PST, in combination with the random generator ZG, generates an anti-comprise variable A1, and then calculates a modified anti-comprise variable A1' therefrom using the one-way function g by means of the function generator FG according to the relationship A1'=g(A1), or in general terms, An'=g(An). The anti-comprise variable A1 is then stored in the user sub-memory URi, and the modified anticomprise variable A1' is stored in the user identification card UAK1.

The identification cards UAK2, ... UAKn, ... UAKi can subsequently be initialized in the same manner, and the variables which are generated and/or calculated for that purpose are respectively stored in each user identification card and in the respected user sub-memories UR2, ... URn, ... URi associated therewith.

In the initialization of the second and further user identification cards, the program control PST ensures that the generated and/or calculated variables are consistent with the generated and/or calculated variables associated with initialization of the first user identification card UAK1. For the second and each further user identification card UAK2 ... UAKn to be initialized, this means that C=I1 ⊕ X1=I2 ⊕ X2=In ⊕ Xn. This can be achieved, for example, by the program control PST generating the external crypto-identification key X2 (through Xn) with the random generator ZG, and then calculates the associated internal crypto-identification key I2 (through In) from the cryptovariable code C which is briefly stored in the program control PST. The only requirement for generating the cryptovariable code in the equipment SG is a user identification card which has already been initialized, which is accomplished by briefly inserting the user card into the user card input UKE.

As soon as the variables are stored in at least a first user sub-memory of the variable memory VSP, a first cryptovariable V1 can be supplied to the user program control PST as long as the valid user identification card allocated to this sub-memory is in the user card input UKE. The cryptovariable V1 is encoded according to the relationship $\widetilde{V1}$ =V1 (+) C, or in general terms, $\widetilde{Vn}$ =Vn (+) C, and is stored in encoded form in the cryptovariable sub-memory KVS. The same sequence can be arbitrarily repeated for further cryptovariables V2, ... Vn, ... Vm.

The one-way functions f and g used for calculating the modified variables represent, for example, exponentiation in the Galois field to a large primary number p. It is assured in this manner that, even if the one-way functions are known, the variables as a practical matter cannot be calculated from the modified variables.

The function execution in the cryptovariable processing stage KVV at the beginning of use of the cryptographic equipment SG shall be described with reference to FIGS. 3 through 5.

Figure 3:
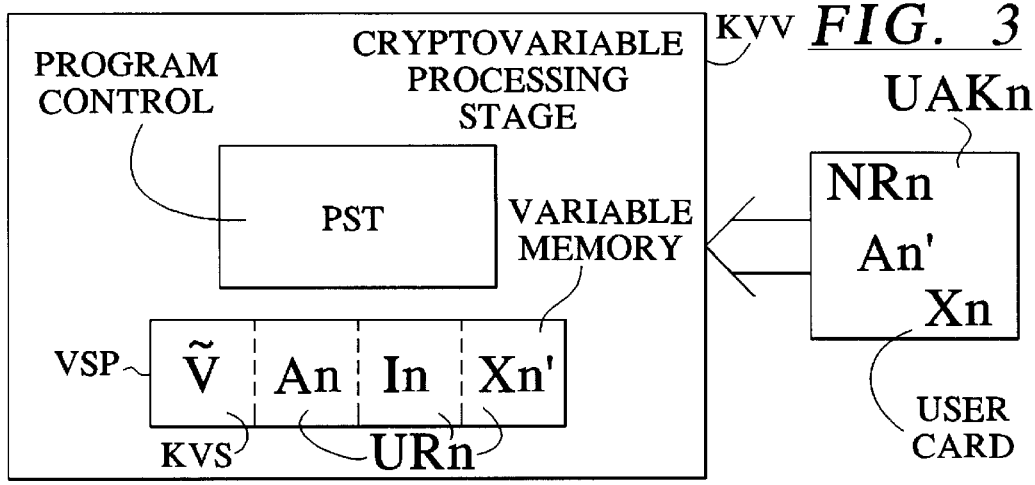
FIGS. 3, 4 and 5 show, in block diagram form, an operation sequence for explaining access to the cryptographic equipment of FIG. 1 using the identification card shown in FIG. 2.

FIG. 3 schematically shows the cryptovariable processing stage KVV with the program control PST and the variable memory VSP. The variable memory VSP includes the cryptovariable sub-memory KVS, in which the encoded cryptovariables $\bar{V}$ are stored, and includes a user sub-memory URn having the anti-comprise variable An, the internal crypto-ignition key In and the external modified crypto-ignition key Xn' stored therein.

As indicated by the arrow in FIG. 3, a user having the user identification card UAKn can switch the cryptographic equipment SG into readiness by introducing a card into the user card input (not shown in detail) of the cryptovariable processing stage KVV. As indicated in FIG. 3, the user identification card number NRn, the modified anti-comprise variable An', and the external crypto-ignition key Xn are stored in the memory of the user identification card UAKn.

Figure 4:
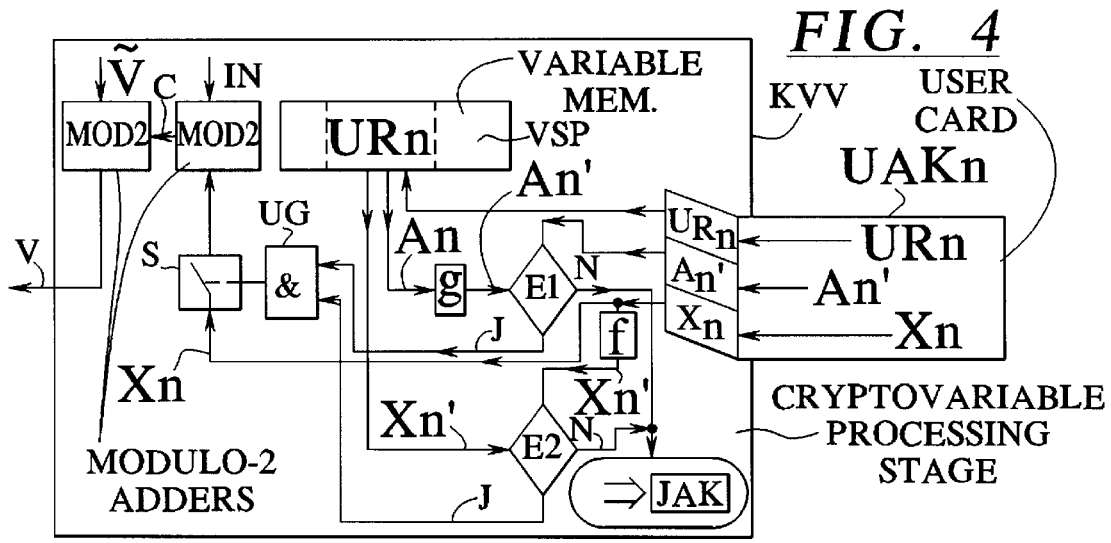
Figure 5:
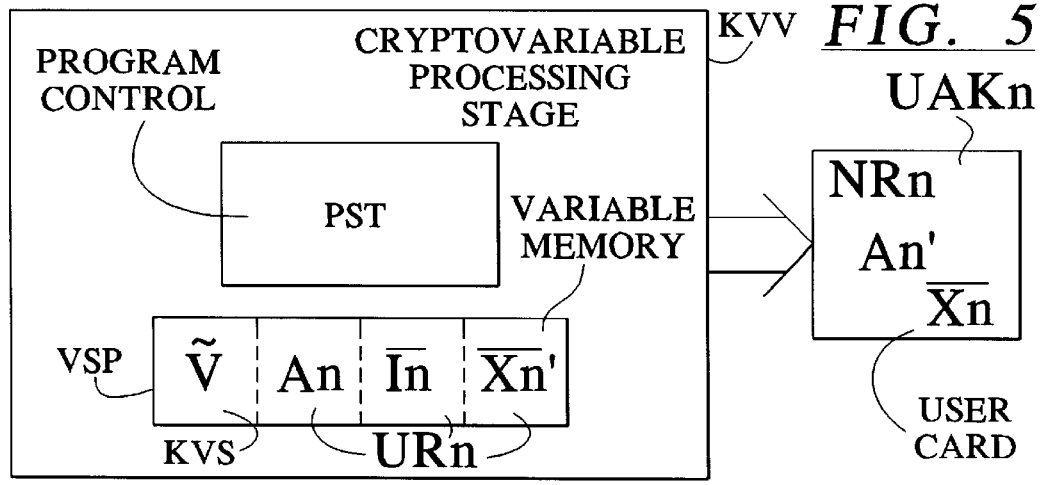

FIG. 4 schematically shows the function execution in the cryptovariable processing stage KVV for accessing the memory contents of the user identification card UAKn. The user identification card number NRn, representing a memory address, serves to interrogate the memory content of the user sub-memory URn. A decision unit El compares the modified anti-comprise variable An' of the user identification card UAKn to the anti-comprise variable AN in the user sub-memory URn which has been converted into the modified anti-comprise variable An' by the one-way function g. The decision unit El signals the end of the authorization check if the decision has a negative (n) outcome, i.e., if there is no coincidence. As indicated at the bottom right of the drawing by an arrow with the user identification card UAKn in an oval, the user identification card UAKn is ejected from the user card input. In the same manner, a decision unit E2 checks for coincidence between the modified external computer-ignition key Xn' in the user sub-memory URn and the external computer-ignition key Xn in the user identification card which was converted by the one-way function f.

If both decision units El and E2 report a positive comparison result (J), a switch s is closed via an AND gate UG, so that the external crypto-ignition key Xn, read from the user identification card UAKn, is supplied to a first modulo-2 adder MOD2, which has a second input supplied with the internal crypto-ignition key In stored in the user sub-memory URn. The operation of the external crypto-ignition key Xn with the internal crypto-ignition key In yields the cryptovariable code C.

With a further modulo-2 adder MOD2, the encoded cryptovariable $\bar{V}$ stored in the cryptovariable sub-memory KVS is then converted into the encoded variable V and, at the output side, is made available to the cryptosequence generator SFE at its control input. The cryptographic equipment is thus operational.

The variables stored in the user sub-memory URn, namely the internal crypto-ignition key In and the modified external crypto-ignition key Xn', and the external crypto-ignition key Xn stored in the user identification card UAKn being used, are then erased and replaced by newly generated, modified values In, Xn and Xn'.

The external crypto-ignition key Xn stored in the user identification card is modified at each successful start-up of the cryptographic equipment SG, so that the possessor of the user card, given a use of the cryptographic equipment SG with a counterfeit user identification card having his memory content, can immediately recognize that such an authorized use has occurred, because the legitimate user's card will not be accepted by the cryptographic equipment SG when he tries to gain access following the unauthorized use.

The cryptographic equipment disclosed herein is especially suited for transmission/reception equipment for information transmission where, for security reasons, high demands are made on the secrecy level of the information to be transmitted, and wherein authorized users can have uncomplicated access to the equipment without the secrecy of the code being compromised.

Although modifications and changes may be suggested by those skilled in the art it is the intention of the inventor to embody within the patent warranted hereon all changes and modifications as reasonably and properly, within the scope of his contribution of the art.

I claim as my invention:

1. In a cryptographic device having means for transmitting and receiving cryptographically encoded information, and cryptosequence generator means for cryptographically encoding information to be transmitted and cryptographically decoding received information using a cryptovariable supplied to a cryptovariable input of said cryptosequence generator means, the improvement of a cryptovariable processing stage connected to said cryptovariable input and comprising:

user card input means for receiving, one at a time, a plurality of user identification cards respectively issued to each authorized user, each user identification card having a different external crypto-ignition key and means for identifying the user to whom said user identification card was issued stored thereon;

a memory having a first sub-memory containing cryptovariables stored in coded form, and a plurality of additional sub-memories corresponding in number, and respectively assigned to, said user identification cards, each additional sub memory having a different internal crypto-ignition key and means for identifying the user of the user identification card assigned thereto stored therein;

means for entering cryptovariables; and control means connected to said cryptovariable input of said cryptosequence generator means, said user card input means, said memory and said means for entering cryptovariables for comparing said means for identifying on a user identification card received in said user card input means with the means for identifying stored in the sub-memory assigned thereto and, in the event of a correspondence, for deriving a cryptovariable code from the external crypto-ignition key stored on the user identification card received in said user card input means and the internal crypto-ignition key stored in the sub-memory assigned thereto, and for briefly supplying said cryptovariable code to said input of said cryptosequence generator.

2. The improvement of claim 1, wherein said control means includes a random generator and a function generator connected to a processor means for modifying variables according to different one-way functions, means for storing a modified external crypto-ignition key and an anti-comprise variable in each of said additional sub-memories, said modified external crypto-ignition key being generated by modifying the external crypto-ignition key on a user card associated with an additional sub-memory using one of said one-way functions, and further comprising means for storing a modified anti-comprised variable on a user identification card, said modified anti-comprised variable being generated by modifying an anti-comprise variable stored in one of said additional sub-memories, associated with the user identification card on which said modified anti-comprise variable is to be stored, using a different one of said one-way functions.

3. The improvement of claim 2, wherein said means for generating said one-way functions is a means for exponentiating in the Galois field to a large primary number.

4. The improvement of claim 1, wherein said cryptographic device is contained within a housing having an openable lid, and further comprising means for automatically erasing the contents of said first sub-memory upon opening of said lid.

5. The improvement of claim 4, wherein said means for erasing the contents of said first sub-memory is a lid contact switch which normally connects said first sub-memory to a first operating voltage and, upon the opening of said lid, connects said first sub-memory to a second operating voltage, said first and second operating voltages having different polarities.

6. A method for operating a cryptographic device having means for transmitting and receiving cryptographically encoded information, and a cryptosequence generator means for cryptographically encoding information to be transmitted and a cryptographically decoding received information using a cryptovariable supplied to a cryptovariable input of said cryptosequence generator means, said method comprising the steps of:

inserting one of a plurality of user identification cards respectively issued to each authorized user into a user card input, each user identification card having a different external crypto-ignition key and means for identifying the user to whom said user identification card was issued stored thereon;

entering cryptovariables into a first sub-memory of a memory, and storing said cryptovariables therein in coded form;

storing a different internal crypto-ignition key in each of a plurality of additional sub-memories of said memory corresponding in number, and respectively assigned to, said user identification cards;

respectively storing means for identifying the user of each user identification card in the sub-memories assigned to said user identification cards;

comparing the means for identifying the user on a user identification card received in said user card input with the means for identifying the user stored in the sub-memory assigned to that user identification card;

in the event of a correspondence from said comparison, deriving a cryptovariable code from the external crypto-ignition key stored on the user identification card received in the user card input and the internal crypto-ignition key stored in the sub-memory assigned thereto; and briefly supplying the derived cryptovariable code to said input of said cryptosequence generator.

7. A method as claimed in claim 6 comprising the additional steps of:

storing respective different anti-comprised variables in said additional sub-memories;

upon the reception of a user identification card in said user card input, modifying the external crypto-ignition key stored thereon using a one-way function and storing the modified external crypto-ignition key in the sub-memory assigned to said user identification card in said user card input;

modifying the anti-comprise variable stored in the sub-memory assigned to said user identification card in said user card input using a different one-way function and storing the modified anti-comprise variable on said user identification card in said user card input, wherein the step of comparing said means for identifying is further defined by comparing the modified anti-comprise variables stored on said user identification card in said user card input with the anti-comprise variables stored in the sub-memory assigned to said user identification card in said user card input, and comprising the further step of:

additionally comparing the external crypto-ignition key stored on said user identification card in said user card input with the modified external crypto-ignition key stored in said sub-memory assigned to said user identification card in said user card input;

and wherein the step of briefly supplying said cryptovariable code to said input of said cryptosequence generator is further defined by briefly supplying said cryptovariable code to said input of said cryptosequence generator in the event of a positive comparison of both said anti-comprise variable with said modified anti-comprise variable and the comparison of said modified external crypto-ignition key with said external crypto-ignition key.

\* \* \* \* \*